UNITED STATES PATENT OFFICE.

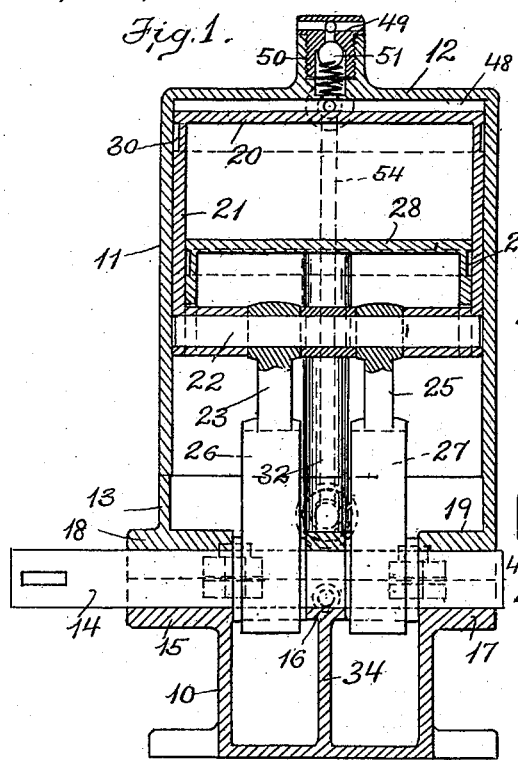

PAUL H. DURUP, OF BOSTON, MASSACHUSETTS.

PUMP.

1,218,246.  Specification of Letters Patent.  Patented Mar. 6, 1917.

Application filed March 2, 1915. Serial No. 11,454.

*To all whom it may concern:*

Be it known that I, PAUL H. DURUP, a subject of the King of Denmark, and resident of Boston, in the county of Suffolk and State of Massachusetts, have invented certain new and useful Improvements in Pumps, of which the following is a specification.

The present invention relates to pumps and other machines of similar structure. The objects of the invention are to provide such a machine which embodies all the advantages of a double acting pump or motor and combines therewith the added advantages of great compactness and efficiency. Without intending to limit my invention I will state that the object which I have had particularly in view has been to produce an air pump suitable for attachment to automobiles to be driven by the motor of the automobile for pumping air into the tires, and in the following description of the herein illustrated embodiment of the invention I will designate the same as a pump.

In the drawings which form a part of this application Figure 1 is a sectional view on a plane including the crank shaft and the axis of the cylinder of my novel pump. Fig. 2 is a sectional view on a plane including the axis of the cylinder and perpendicular to the crank shaft of the pump. Fig. 3 is an elevation of the pump. Fig. 4 is a cross section on line 4—4 of Fig. 2 looking downward.

The casing of the pump comprises a crank case 10, a cylinder 11 having a head 12 at one end and a ring 13 between the crank case and the cylinder case. The crank shaft 14 is supported by bearings 15, 16 and 17 in the crank case and is embraced on its upper side by boxes 18 and 19 which are formed on the intermediate ring 13.

The piston is shown at 20 and it has a hollow trunk 21 fitting the interior of the cylinder 11. This trunk supports the ends of a wrist pin 22 which passes through bearings in the eccentric rods 23, 24 which are engaged with, and operated in any usual or desired way by, eccentrics 26 and 27 on the shaft 14.

The principal novel feature of the invention consists in the arrangement of the piston and the two cylinder heads by which the pump is made double acting, and the mode of mounting the inner cylinder head by which the pump is made compact. The inner cylinder head is shown at 28. It is entirely within the cylindrical outer casing 11 and also within the piston trunk 21, having a sliding bearing with a close fit upon the inner surface of such trunk. The bearing between the inner head and the interior of the trunk may be easily packed tightly enough by means of packing rings in a groove 29 on the outer cylindrical face of the head, in the same way that many pump and engine pistons are packed. The piston is provided with a groove 30 adapted to contain packing rings to prevent leakage between its outer surface and the outer cylindrical casing. For supporting and holding the inner head in place I provide a frame consisting of side members 31 and 32 and a bottom cross member 33. The latter rests upon a web 34 in the middle of the crank case and is shaped to overlie the shaft 14 and provide a box for the bearing 16, which is provided on the upper end of the web 34. Lugs 35 and 36 on the under side of the cross piece 33 project into notches in the upper part of the web 34, and such lugs are retained in place by bolts 37 and 38 which pass through them from the outer sides of the crank case and are contained in passages in the thickened upper part of the web 34 as best shown in Fig. 2. Preferably the head 28, side members 31 and 32 and the bottom member 33 are all made as one integral casting, although I do not limit the details of construction of or the method of making the same in any respect. The above described mode of securing the head 28 keeps it in its required relation to the piston, making any displacement impossible.

The uprights 31 and 32 also provide channels for the intake and exhaust of air in the chamber 39 between the piston and inner head 28. The passageway 40 runs through the member 31 from the chamber 39 to a nipple 41 which passes out through the sides of the outer casing, and in which there is an inwardly opening check valve 42, the seat for which is formed in a thimble 43 which is screwed into the open end of this nipple. The exhaust passage 44 is formed in the upright 32 and extends through a nipple 45 leading out from the upright through the crank case. This nipple 45 is formed with a valve seat 46 and contains an outwardly opening check valve 47.

The intake for the chamber 48 between the piston and the outer cylinder head is formed by one or more passages in a thimble 49 which is threaded into a nipple 50 on the outer head, and in which there is an inwardly opening check valve 51. The exhaust from chamber 48 is through a port 52 in the side of this chamber controlled by an outwardly opening check valve 53 and thence through a passage 54 in the outer cylinder wall, which passage opens into a side port in the nipple 45. Said nipple is threaded so as to receive a coupling 55 to which a hose or other conduit may be connected.

The operation of the pump is so obvious as to require no description. It may be pointed out, however, that my improved construction provides air chambers on opposite sides of the piston in which alternately air is admitted and compressed. The exhaust from both chambers leads to the same coupling. Such a pump may be made in small sizes and is adapted for use as an automobile tire pump and adapted to be permanently or detachably connected with the motor of an automobile. The arrangement of the inner cylinder head within the piston trunk is of high advantage in enabling me to make the engine compact, particularly of short cylinder length and with small clearance between the piston head and both cylinder heads, without sacrificing length of stroke and at the same time retaining the double acting feature. Both chambers of the cylinder are at the same side of the crank shaft, and yet there is no piston rod, and neither is the crank case made a part of one of the chambers of the pump.

The particular construction of the parts of the pump allows the same to be readily assembled and taken apart. The ring 13 is connected to the crank case by bolts passing through a number of lugs 56, and the outer cylinder casing is similarly connected detachably to the ring. This construction also saves weight in that it dispenses with a piston rod, cross head and cross head guides, such as are required in the ordinary reciprocating steam engine.

It is within my contemplation to make a two-cylinder double-acting pump by simply removing the crank case and attaching to the remaining parts duplicates of such parts, (outer casing, piston, and inner head with its supporting frame) arranged in inverted order and in axial alinement.

What I claim and desire to secure by Letters Patent is:

1. A double acting pump comprising an outer casing having an outer head, a trunk piston fitting slidingly in said casing, a shaft having a crank, a connecting rod joined at one end to said crank, a wrist pin mounted at its opposite ends in the side walls of the piston trunk, joined to the opposite end of said connecting rod, an inner head fitting the interior of the piston trunk, a base on which said crank shaft is supported, and supports for said inner head arranged on opposite sides of the axis of said wrist pin and mounted on said base; the chambers between the inner and outer head and the piston having ports for admission and exhaust of fluid.

2. A double acting pump comprising a cylinder having a head and inlet and exhaust ports adjacent to said head, automatic check valves controlling said ports, a trunk piston fitting said cylinder with its trunk extending away from the cylinder head, a fixed cylinder head fitting within the trunk of the piston at the opposite side of the piston from the first cylinder head and having admission and exhaust ports opening into the space within the trunk piston between the head of the latter and said fixed cylinder head, and automatic check valves arranged to control flow through said ports.

3. A double acting pump comprising a cylinder having inlet and exhaust means and a head, a trunk piston fitting said cylinder having an imperforate head and arranged with its trunk extending away from the head of said cylinder, a fixed cylinder head fitting within the trunk of the piston on the opposite side of the imperforate piston head from the first cylinder head, and having admission and exhaust means opening into the space within the trunk piston between the head of the latter and said fixed cylinder head, a wrist pin mounted at its opposite ends in the piston trunk at the opposite side of the second cylinder head from the piston head, two connecting rods pivoted on said wrist pin, a crank shaft, two eccentrics mounted on said crank shaft, and eccentric straps surrounding said eccentrics and joined to said connecting rods.

4. A pump comprising a crank case having bearings, a crank shaft mounted in said bearings, an outer cylinder supported on the crank case having an inlet and an outlet with check valves controlling the same, a piston fitting said cylinder, a wrist pin carried by the piston, a connecting rod between said wrist pin and the crank of the crank shaft, said piston having a trunk, an inner cylinder head fitting within the piston trunk and a frame supporting said inner cylinder head comprising side members on opposite sides of the wrist pin secured to the crank case and joined to the cylinder head, one of said side members having an admission passage and the other having an exhaust passage, opening through the cylinder head to the space between the latter and the head of the piston, said passages having openings external to the outer cylinder.

5. A pump comprising a crank case having bearings, a crank shaft mounted in said bearings, an outer cylinder supported on the crank case having an inlet and an outlet with check valves controlling the same, a piston fitting said cylinder, a wrist pin carried by the piston, a connecting rod between said wrist pin and the crank of the crank shaft, said piston having a trunk, an inner cylinder head fitting within the piston trunk, and a frame supporting said inner cylinder head comprising side members on opposite sides of the wrist pin secured to the crank case and joined to the cylinder head, and a cross member overlying the crank shaft and forming an upper bearing for the same, one of said side members having an admission passage and the other having an exhaust passage, opening through the cylinder head to the space between the latter and the head of the piston, said passages having openings external to the outer cylinder.

6. A pump comprising a crank case having bearings, a crank shaft mounted in said bearings, an outer cylinder supported on the crank case having an inlet and an outlet with check valves controlling the same, a piston fitting said cylinder, a wrist pin carried by the piston, a connecting rod between said wrist pin and the crank of the crank shaft, said piston having a trunk, an inner cylinder head fitting within the piston trunk, and a frame supporting said inner cylinder head comprising side members on opposite sides of the wrist pin secured to the crank case and joined to the cylinder head, one of said side members having an admission passage and the other having an exhaust passage, opening through the cylinder head to the space between the latter and the head of the piston, said passages having openings external to the outer cylinder, the outlet from the outer cylinder being continued through the wall of the cylinder and joined into the passage through the second named one of the side frame members of the inner cylinder head.

7. A pump comprising a crank case having bearings, a crank shaft mounted in said bearings, an outer cylinder supported on the crank case having an inlet and an outlet with check valves controlling the same, a piston fitting said cylinder, a wrist pin carried by the piston, a connecting rod between said wrist pin and the crank of the crank shaft, said piston having a trunk, an inner cylinder head fitting within the piston trunk, and a frame supporting said inner cylinder head, comprising side members on opposite sides of the wrist pin secured to the crank case and joined to the cylinder head, one of said side members having an admission passage and the other having an exhaust passage, opening through the cylinder head to the space between the latter and the head of the piston, said passages having openings external to the outer cylinder, the outlet from the outer cylinder being continued through the wall of the cylinder and joined into the passage through the second named one of the side frame members of the inner cylinder head and a pipe coupling attached to the common outlet of the two exhaust passages adapted to receive a conduit.

8. A single stage double acting air pump comprising outer and inner concentric cylinders having an annular space between their side walls and a space between their heads, a trunk piston located in such space with its trunk fitting the interior of the outer cylinder and the exterior of the inner cylinder, means for reciprocating said piston, inlets opening into the spaces on opposite sides of the piston head, outwardly closing check valves for said inlets, separate outlet ports from said spaces, inwardly closing check valves for said outlet ports, and a passage connecting both outlet ports and having a single external orifice.

9. A single stage double acting air pump comprising outer and inner concentric cylinders arranged with a space between their relatively corresponding heads and with their side walls spaced apart, a trunk piston fitting within the outer cylinder and also fitting outside of the inner cylinder, having a head located in the space between the two cylinder heads, means for reciprocating said piston, inlets opening into the spaces on opposite sides of the piston heads, outwardly closing check valves for said inlets, separate outlet ports for said spaces, and inwardly closing check valves for said outlet ports.

In testimony whereof I have affixed my signature, in presence of two witnesses.

PAUL H. DURUP.

Witnesses:
ARTHUR H. BROWN,
P. W. PEZZETTI.